US012193349B2

(12) United States Patent
Schermerhorn

(10) Patent No.: US 12,193,349 B2
(45) Date of Patent: Jan. 14, 2025

(54) ACTIVE DOWN-PRESSURE ARRANGEMENT FOR AGRICULTURAL IMPLEMENT

(71) Applicant: Nathan Schermerhorn, Wawaka, IN (US)

(72) Inventor: Nathan Schermerhorn, Wawaka, IN (US)

( * ) Notice: Subject to any disclaimer, the term of this patent is extended or adjusted under 35 U.S.C. 154(b) by 349 days.

(21) Appl. No.: 17/569,174

(22) Filed: Jan. 5, 2022

(65) Prior Publication Data
US 2022/0248591 A1    Aug. 11, 2022

Related U.S. Application Data

(60) Provisional application No. 63/136,745, filed on Feb. 23, 2021.

(51) Int. Cl.
*A01B 73/04*    (2006.01)
*A01B 63/32*    (2006.01)

(52) U.S. Cl.
CPC ............ *A01B 73/044* (2013.01); *A01B 63/32* (2013.01)

(58) Field of Classification Search
CPC ....... A01B 73/044; A01B 73/04; A01B 63/22; A01B 63/32; A01D 78/1014
See application file for complete search history.

(56) References Cited

U.S. PATENT DOCUMENTS

| | | | | |
|---|---|---|---|---|
| 4,030,551 A | * | 6/1977 | Boetto | A01B 73/044 91/170 R |
| 4,047,575 A | * | 9/1977 | Wagner | A01B 73/044 172/414 |
| 4,151,886 A | * | 5/1979 | Boetto | A01B 73/02 172/311 |
| 4,271,711 A | | 6/1981 | Vavra | |
| 4,479,554 A | * | 10/1984 | Kueker | A01B 73/044 74/105 |
| 4,660,654 A | | 4/1987 | Wiebe et al. | |
| 5,687,798 A | | 11/1997 | Henry et al. | |
| 6,125,775 A | | 10/2000 | Gust | |
| 6,318,477 B1 | | 11/2001 | Bettin | |

(Continued)

FOREIGN PATENT DOCUMENTS

| | | | |
|---|---|---|---|
| EP | 2494861 A1 * | 9/2012 | ........... A01B 73/044 |
| EP | 2494861 B1 | 12/2013 | |
| WO | WO2008034217 | 3/2008 | |

*Primary Examiner* — Adam J Behrens
*Assistant Examiner* — Blake E Scoville

(57) ABSTRACT

An agricultural implement having a center section and wings is converted from dedicated free-floating wings to provide active-down pressure upon the wings. The agricultural implement has been manufactured with hydraulic cylinders to raise and lower the wings. The hydraulic cylinders are connected at one end to the center section, and at the other end to the wings by way of pins and slots. The hydraulic cylinders, the pins, and the slots are configured so that when the wings are lowered, the wings of the agricultural implement as manufactured free-float vertically by way of unrestricted motion of the pins in the slots. Tie-plates and second pins are configured to engage the first pins and the slots, and to restrict the motion of the first pins in the slots. A pressure controlled hydraulic circuit is connected to the hydraulic cylinders and controls an amount of down-pressure applied by the hydraulic cylinders.

9 Claims, 12 Drawing Sheets

(56) References Cited

U.S. PATENT DOCUMENTS

| | | |
|---|---|---|
| 6,378,619 B2 | 4/2002 | Mayerle et al. |
| 8,336,639 B2 | 12/2012 | Palen |
| 8,573,321 B2 | 11/2013 | Audigie |
| 8,794,344 B2 | 8/2014 | Blunier |
| 8,960,321 B2 | 2/2015 | Tamm |
| 9,826,671 B2 | 11/2017 | Redekop |
| 10,426,074 B2 * | 10/2019 | Antoni .................. A01B 73/04 |
| 2003/0182912 A1 | 10/2003 | Boll |
| 2018/0049363 A1 * | 2/2018 | Antoni ................. A01B 73/044 |

* cited by examiner

ACTIVE DOWN-PRESSURE ARRANGEMENT FOR AGRICULTURAL IMPLEMENT

CROSS-REFERENCE TO RELATED APPLICATIONS

The present application claims priority to U.S. Provisional Application No. 63/136,745, accorded filing date Feb. 23, 2021, and to Canadian Application No. 3,108,828 filed Feb. 9, 2021, the entire contents of all of which are herein incorporated by reference.

BACKGROUND

Field of Invention

Embodiments of the present invention described herein generally relate to an Active Down-Pressure Arrangement for an Agricultural Implement. The Active Down-Pressure Arrangement for an Agricultural Implement is designed to convert an agricultural implement having wings from a dedicated vertically free-floating configuration with respect to the wings, to controlled down-pressure operation with respect to the wings.

Related Art

Towed agricultural implements are used for various agricultural operations, including plowing, cultivating, planting, and fertilizing. In order to maximize efficiency and productivity, towed agricultural implements are often very wide. In this way, the towed agricultural implement can perform operations over a large swath of ground in a single pass. However, in order to provide for transportation of the towed agricultural implement over public roads having width limits, and in order to compensate for unevenness in crop fields, wide towed agricultural implements are often configured with hinged or otherwise articulating wings. These wings may be raised to a vertical position in order to make the towed agricultural implement narrow enough to be transported over public roads. The wings may then be lowered to a horizontal position for use in the field.

In order to compensate for crop field unevenness when in the horizontal position, wings of towed agricultural implements may be vertically free-floating, or they may be actively controlled in their down-pressure. Alternately, it is known to provide wings that are rigidly connected to the center section when in the horizontal position, thereby providing no compensation for crop field unevenness. If the wings are configured for active down-pressure control, then they are generally provided with hydraulic cylinders that are pivotally connected to the center section of the towed agricultural implement, and that are also pivotally connected to the wings. Pressure in the hydraulic cylinders is controlled as the wings articulate over uneven ground, resulting in constant down-pressure on the wings. If the wings are configured as vertically free-floating, then they may be provided with a slotted arrangement that engages one end of the hydraulic cylinders used to raise the wings into a vertical position. In this way, when the wings are in the horizontal position, they can articulate up and down to compensate for ground contours, while the connection at the end of the hydraulic cylinder floats within the slotted arrangement. The presence of this slotted arrangement means that a towed agricultural implement manufactured with vertically free-floating wings cannot readily be reconfigured into one with actively controlled down-pressure.

It is further known to provide arrangements for converting wings of towed agricultural implements from vertically free-floating to rigidly connected to the center section. European Patent No. EP2499486181 (Bergere) and U.S. Pat. No. 8,960,321 (Tamm) provide such an arrangement. It is also known to provide both vertically free-floating functionality and actively controlled down-pressure to wings of towed agricultural implements, but only at the considerable expense and complexity of providing an additional hydraulic cylinder and associated hydraulic circuitry and complicated and expensive valving. U.S. Pat. No. 6,378,619 (Mayerle, et al.) provides such an arrangement.

While it is known to convert wings of towed agricultural implements from vertically free-floating to rigidly connected, and while it is known to actively control down-pressure in wings of towed agricultural implements using hydraulic cylinders, no method exists for simply and effectively converting an agricultural implement having dedicated vertically free-floating wings to one having wings with actively controlled down-pressure. Accordingly, there is an unmet need for a solution that simply and effectively converts an agricultural implement having dedicated vertically free-floating wings and to one with wings that have actively controlled down-pressure.

SUMMARY

Embodiments described herein relate to an Active Down-Pressure Arrangement for an Agricultural implement that is designed to simply and effectively convert the hinged or otherwise articulating wings of an agricultural implement from vertically free-floating to actively controlled down-pressure when in the horizontal position. The Active Down-Pressure Arrangement for an Agricultural Implements includes converting the hydraulic circuit connected to the wing extension and retraction cylinders to a pressure controlled hydraulic circuit using a hydraulic pressure control valve that is controlled according to the desired amount of down-pressure. The wing extension and retraction cylinders as originally constructed engage a pin that free-floats in a slot, so that when extended, the hinged wings free-float vertically by way of the unrestricted motion of the pin in the slot.

The method and apparatus of the Active Down-Pressure Arrangement for an Agricultural implement includes a tie-plate and second pin. The tie-plate of the method and apparatus engages the previously unrestricted pin within the clevis of the cylinder (which clevis may be original, or part of the conversion kit), and extends to the far end of the slot. The second pin is added to the slot at the far end, thereby converting the unrestricted motion of the pin in the slot to a fixed pivoting location in the slot. In this way, the unrestricted motion of the pin in the slot is eliminated, and the hinged wings are no longer vertically free-floating. Instead, the wing extension and retraction cylinders are able to exert controlled pressure against the tie plate and second pin, and thereby to the wings to provide actively controlled down-pressure, while the hydraulic pressure control valve regulates the hydraulic pressure provided by the tractor hydraulic supply to the wing extension and retraction cylinders.

It is contemplated that embodiments of the method and apparatus of the Active Down-Pressure Arrangement for an Agricultural implement may further include providing a both a hydraulic pressure control valve and/or a non-pressure control valve, or a valve that acts in both capacities, so that the agricultural implement may be readily switched back and forth between vertically free-floating wings and wings having actively controlled down-pressure by simply adding or removing the tie plate and second pin. It is further contemplated that the principles of the Active Down-Pressure Arrangement for an Agricultural Implement may be applied to any style of articulating wings of an agricultural implement that utilizes wing extension and retraction cylinders that engage a pin that floats in a slot, whether or not such style of articulating wings are hingedly connected to the center section of the agricultural implement.

By providing a method and apparatus for simply and effectively converting the hinged or otherwise articulating wings of an agricultural implement from vertically free-floating to actively controlled down-pressure when in the horizontal position, the Active Down-Pressure Arrangement for an Agricultural Implement allows the operator of an existing agricultural implement to better distribute the weight of the center section across the entire agricultural implement. This allows constant down-pressure to be applied and eliminates the need to add weights to the wings, and makes the machine float across wet and/or uneven ground better.

According to one embodiment of the Active Down-Pressure Arrangement for an Agricultural Implement, an agricultural implement is converted from dedicated vertically free-floating wings to provide active-down pressure upon one or more wings thereof. The agricultural implement has a center section and the one or more wings. The agricultural implement has been manufactured with hydraulic cylinders operable to raise the one or more wings to a vertical position and to lower the one or more wings to a horizontal position. The hydraulic cylinders are connected at one end to the center section, and are connected at the other end to the one or more wings by way of first pins and slots. The hydraulic cylinders, the first pins, and the slots are further configured so that when the one or more wings are in the horizontal position, the one or more wings of the agricultural implement as manufactured free-float vertically by way of unrestricted motion of the first pins in the slots. Tie-plates and second pins are configured to engage the first pins and the slots, and to restrict the motion of the first pins in the slots. A pressure controlled hydraulic circuit is connected to the hydraulic cylinders and is operable to control an amount of down-pressure applied by the hydraulic cylinders.

According to another embodiment of the Active Down-Pressure Arrangement for an Agricultural Implement, a conversion kit is provided for converting one or more wings of an agricultural implement from dedicated free-floating operation to active down-pressure. The agricultural implement has a center section and the one or more wings. The agricultural implement has been manufactured with hydraulic cylinders operable to raise the one or more wings to a vertical position and to lower the one or more wings to a horizontal position. The hydraulic cylinders are connected at one end to the center section, and are connected at the other end to the one or more wings by way of first pins and slots. The hydraulic cylinders, the first pins, and the slots are further configured so that when the one or more wings are in the horizontal position, the one or more wings of the agricultural implement as manufactured free-float vertically by way of unrestricted motion of the first pins in the slots. The conversion kit includes tie-plates and second pins configured to engage the first pins and the slots, and to restrict the motion of the first pins in the slots. A pressure controlled hydraulic circuit is connected to the hydraulic cylinders and is operable to control an amount of down-pressure applied by the hydraulic cylinders.

According to yet another embodiment of the Active Down-Pressure Arrangement for an Agricultural implement, a method of converting one or more wings of an agricultural implement from dedicated free-floating operation to active down-pressure includes several steps. The first step is providing the agricultural implement having a center section and the one or more wings. The agricultural implement has been manufactured with hydraulic cylinders operable to raise the one or more wings to a vertical position and to lower the one or more wings to a horizontal position. The hydraulic cylinders are connected at one end to the center section, and are connected at the other end to the one or more wings by way of first pins and slots. The hydraulic cylinders, the first pins, and the slots are further configured so that when the one or more wings are in the horizontal position, the one or more wings of the agricultural implement as manufactured free-float vertically by way of unrestricted motion of the first pins in the slots. The second step is engaging tie-plates and second pins with the first pins and the slots, and restricting by way of the tie-plates and the second pins the motion of the first pins in the slots. The third step is connecting a pressure controlled hydraulic circuit to the hydraulic cylinders and operating the pressure controlled hydraulic circuit to control an amount of down-pressure applied by the hydraulic cylinders.

DESCRIPTION OF THE DRAWINGS

The above-mentioned and other features of embodiments of the Active Down-Pressure Arrangement for an Agricultural Implement, and the manner of their working, will become more apparent and will be better understood by reference to the following description of embodiments of the Active Down-Pressure Arrangement for an Agricultural Implement taken in conjunction with the accompanying drawings, wherein.

Figure 1:
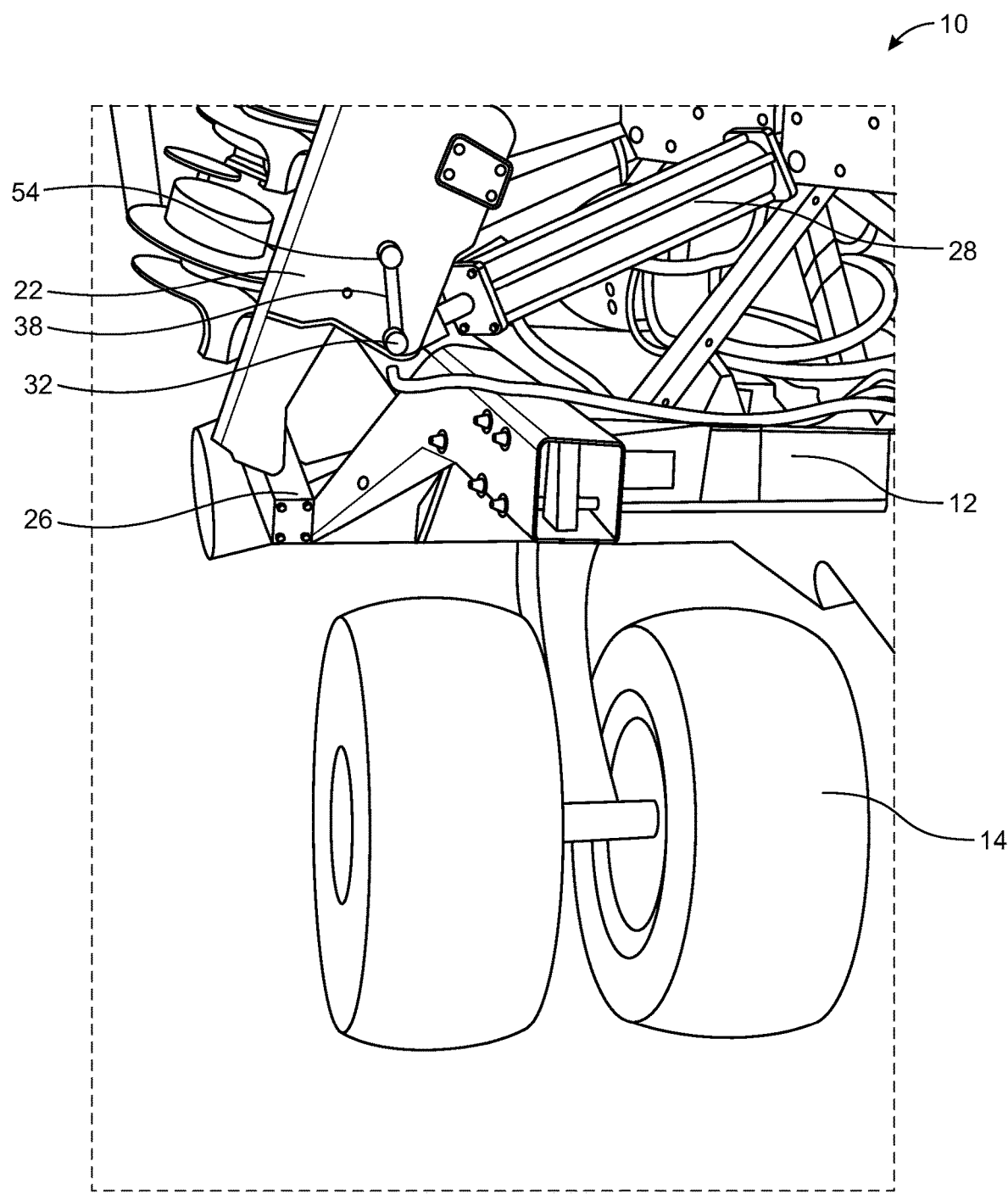
FIGS. 1 and 2 are front right perspective views of part of the center section and part of the right wing of a towed agricultural implement having an embodiment of the Active Down-Pressure Arrangement for an Agricultural Implement of the present invention, as described herein.
Figure 2:
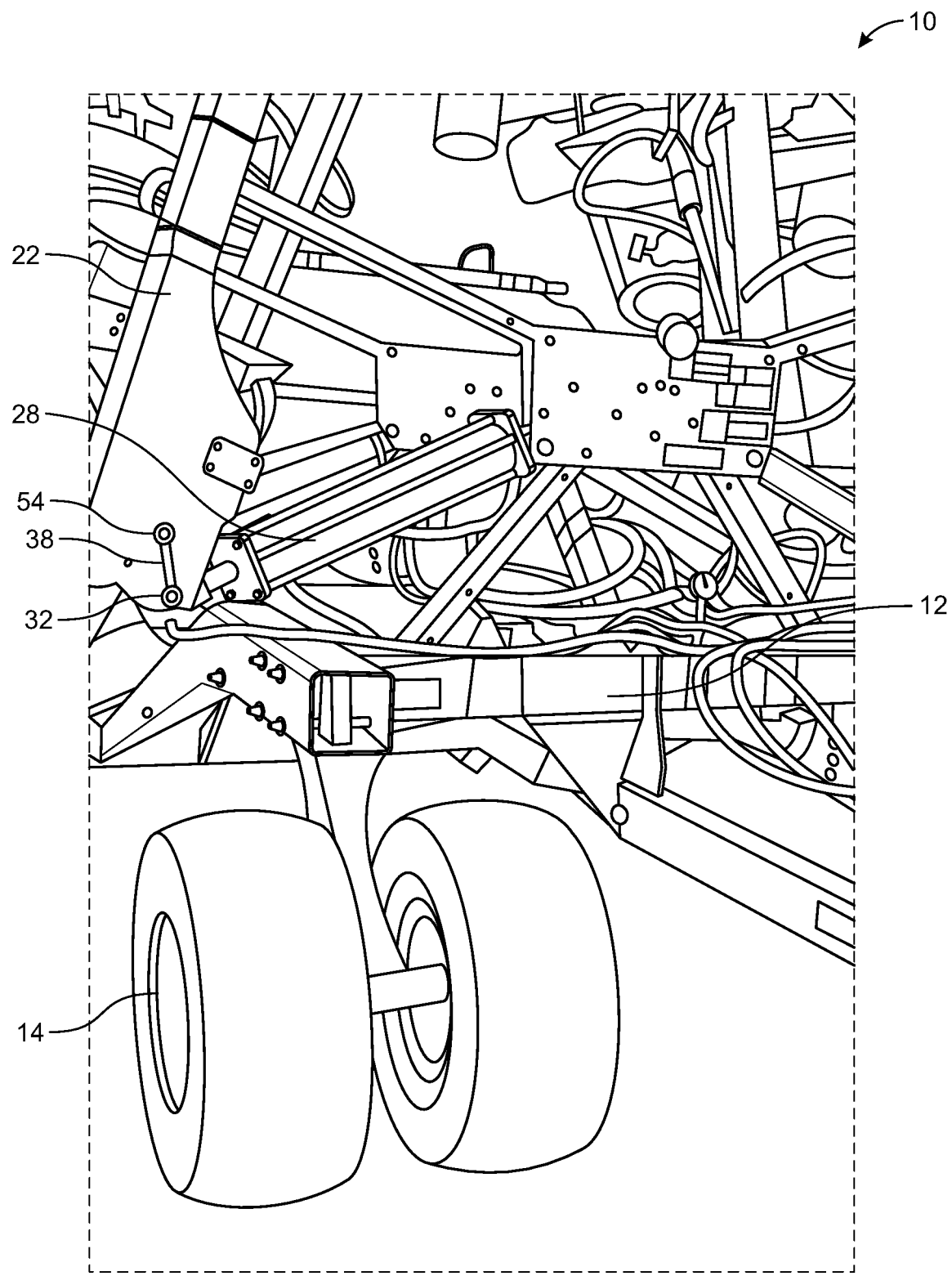
Figure 3:
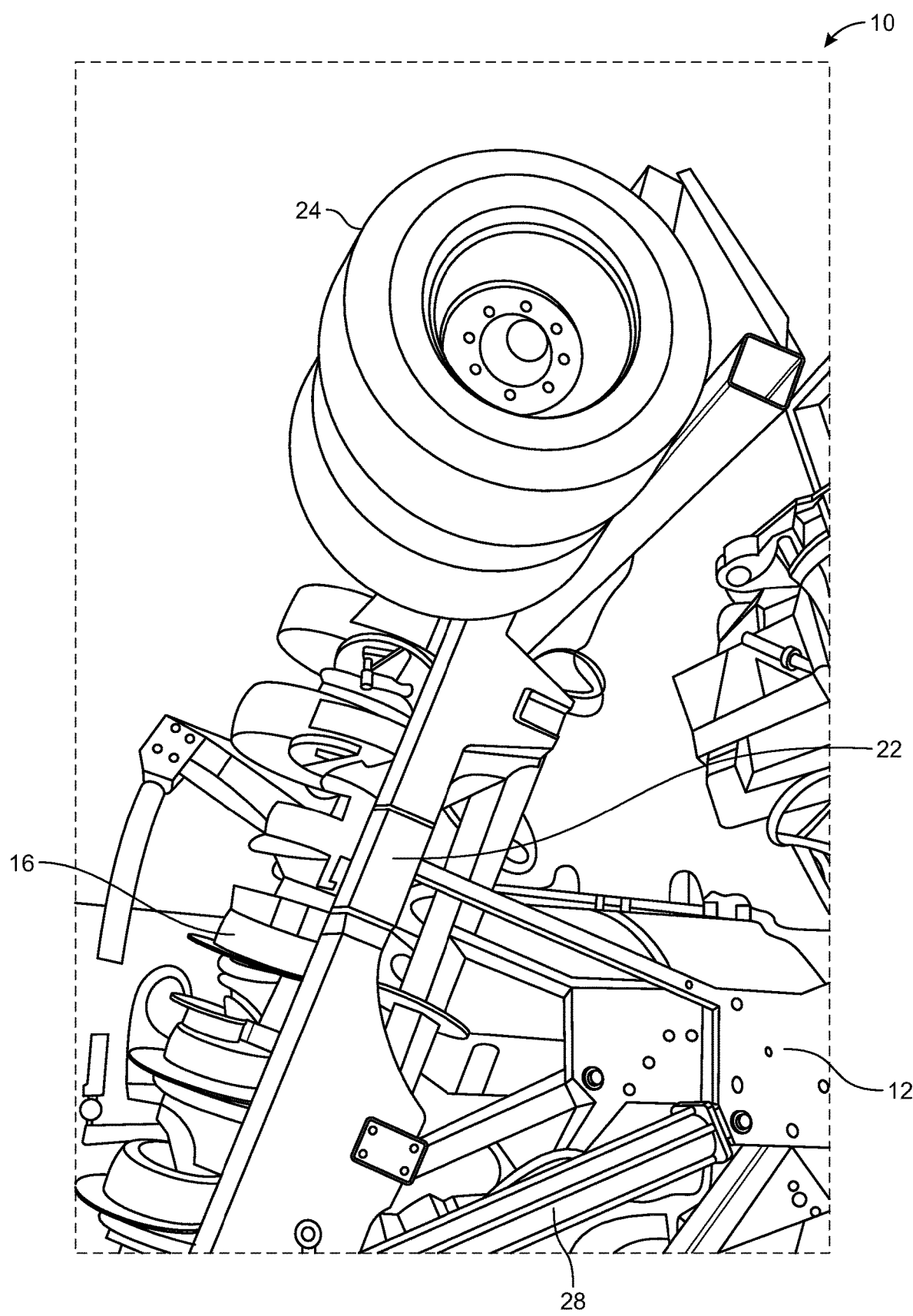
FIGS. 3 and 4 are front right perspective views of part of the right wing and part of the left wing, respectively, of a towed agricultural implement having an embodiment of the Active Down-Pressure Arrangement for an Agricultural Implement of the present invention, as described herein.
Figure 4:
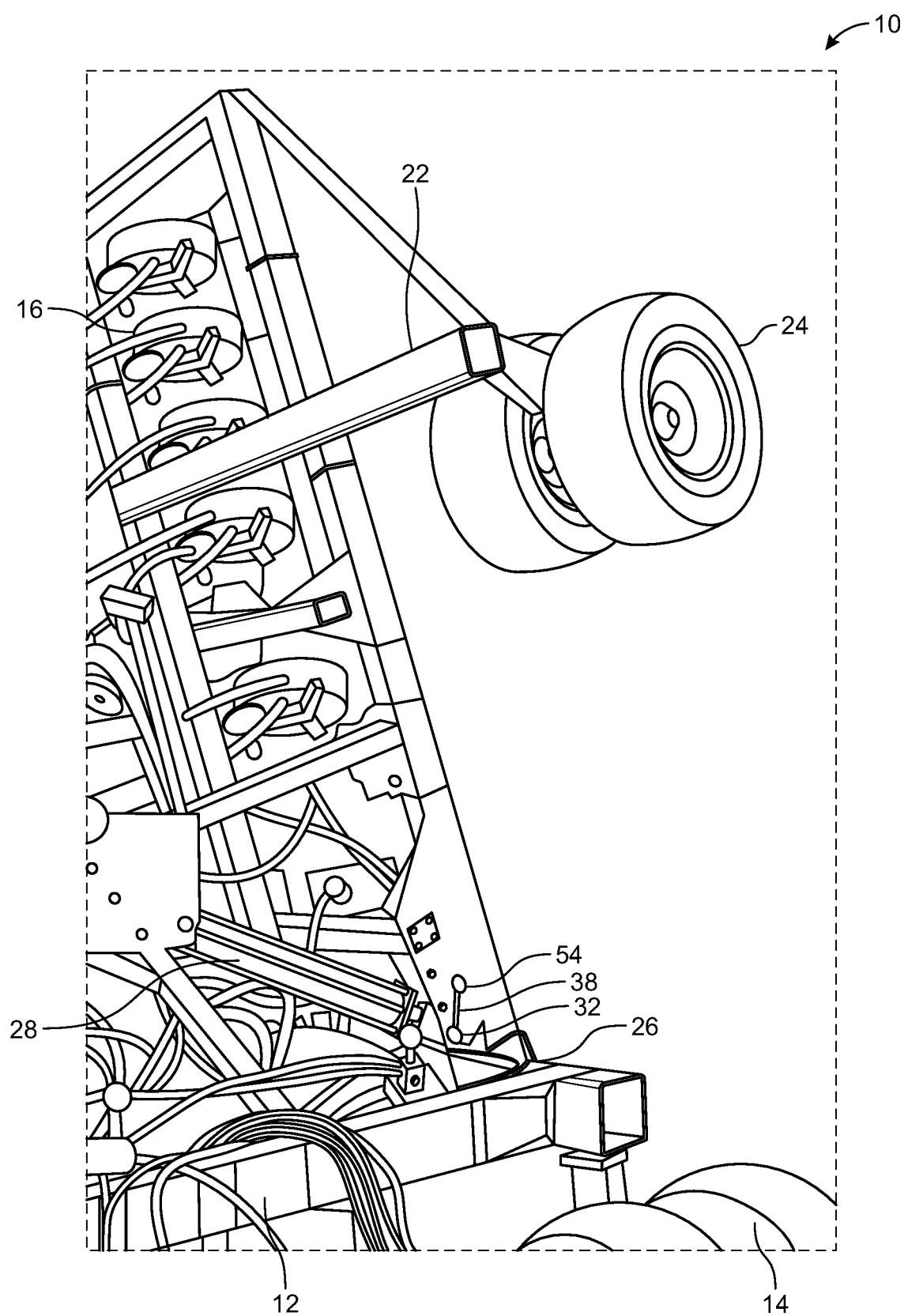

Corresponding reference numbers indicate corresponding parts throughout the several views. The exemplifications set out herein illustrate embodiments of the Active Down-Pressure Arrangement for an Agricultural Implement, and such exemplifications are not to be construed as limiting the scope of the claims in any manner.

DETAILED DESCRIPTION

The following detailed description and appended drawing describe and illustrate various exemplary embodiments of the invention. The description and drawings serve to enable one skilled in the art to make and use the invention, and are not intended to limit the scope of the invention in any manner. In respect of any methods disclosed and illustrated, the steps presented are exemplary in nature, and thus, the order of the steps is not necessary or critical.

Turning now to FIGS. 1 through 4, an agricultural implement 10 having a non-limiting exemplary embodiment of the Active Down-Pressure Arrangement for an Agricultural Implement is shown. The agricultural implement 10 has a center section 12 and two wings 22. The center section 12 is supported by center section bogies 14, and the wings 22 are supported by wing bogies 24 when in the horizontal position. The center section 12 and the wings 22 are provided with a number of ground openers 16 or other agricultural tools. The wings 22 are connected to the center section 12 by way of wing hinges 26, so that the wings 22 may pivot about a longitudinal hinge axis to a vertical position or to a horizontal position. In order to raise and lower the wings 22, wing extension and retraction cylinders 28 are connected to the center section 12 and to the wings 22.

As originally manufactured, the wing extension and retraction cylinders 28 of the agricultural implement 10 engage the wings 22 by way of pins 32 that travel in slots 38. When the wing extension and retraction cylinders 28 are used to raise the wings 22, the pins 32 first travel to the end of the slots 38 closest to the wing hinges 26 and to the center section 12. When the pins 32 reach the end of their travel in the slots 38, the wing extension and retraction cylinders 28 are able to pull the wings 22 to their vertical positions as shown. When the wing extension and retraction cylinders 28 are used to lower the wings 22 to their horizontal positions, the geometry of the connections between the wing extension and retraction cylinders 28 and the center section 12, the connections between the wing extension and retraction cylinders 28 and the slots 38, and the locations of the wing hinges 26 dictates that the pins 32 remain in the lower end of the slots 38 until the wing has travelled past vertical and gravity begins to pull the wings 22 downward. Thus, the pins 32 remain in the lower or inward end of the slots 38 through the downward travel of the wings 22.

As originally manufactured, once the wing extension and retraction cylinders 28 of the agricultural implement 10 are fully extended, the wings 22 are level with the center section 12 and supported by the wing bogies 24, then the pins 32 are approximately centered between the ends of the slots 38. The wings 22 are then able to free-float vertically as the agricultural implement 10 pass over uneven ground, while the pins 32 float within the length of the slots 38. As originally manufactured, no provision is made within the agricultural implement 10 for controlling down-pressure of the wings 22. With regards to the present Active Down-Pressure Arrangement for an Agricultural Implement, then, second pins 54 are shown located at the outward end of the slots 38, the function of which will become apparent with reference to later figures.

Figure 5:
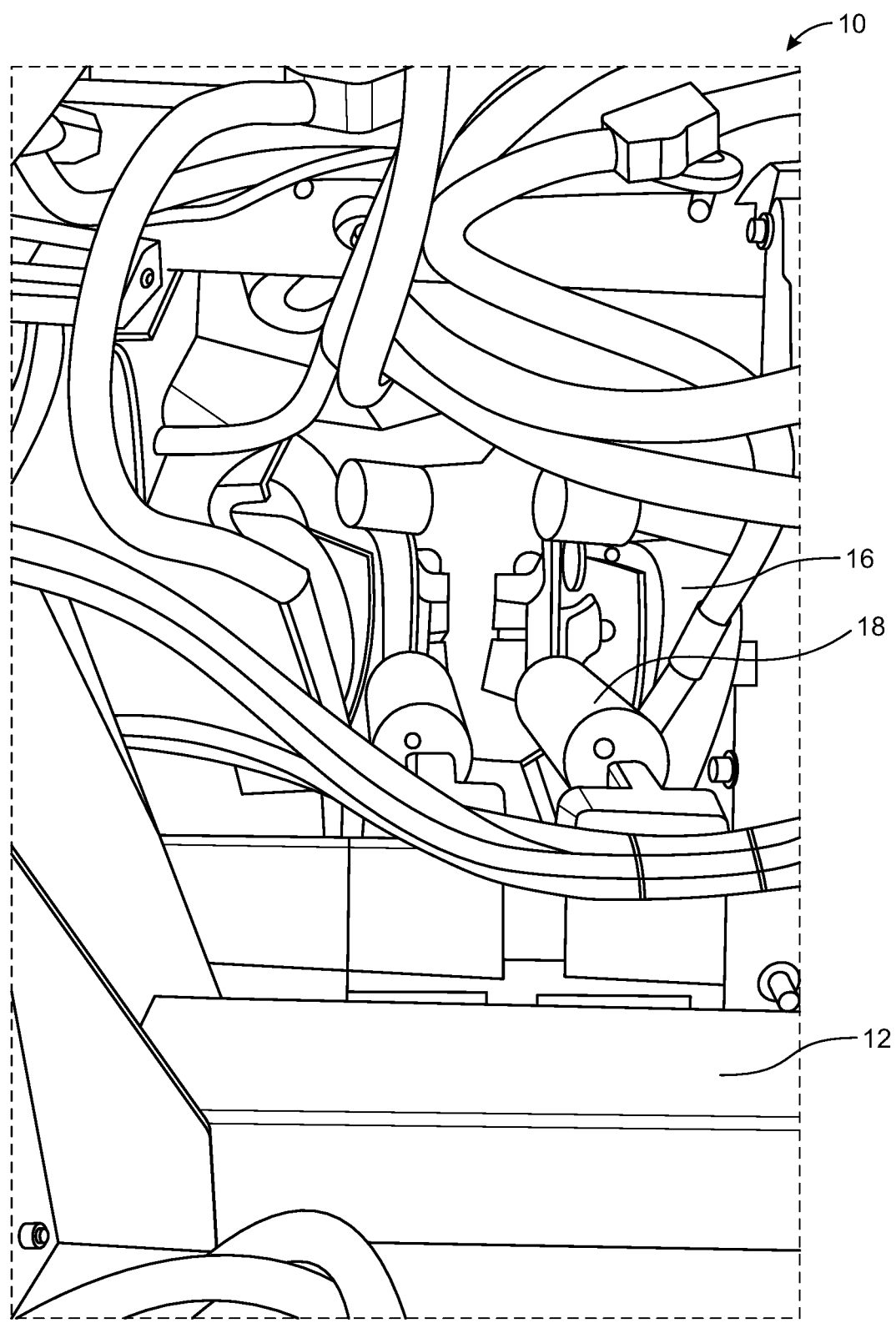
FIG. 5 is a front top perspective view of ground openers and their cylinders of a towed agricultural implement having an embodiment of the Active Down-Pressure Arrangement for an Agricultural Implement of the present invention, as described herein.
Figure 6:
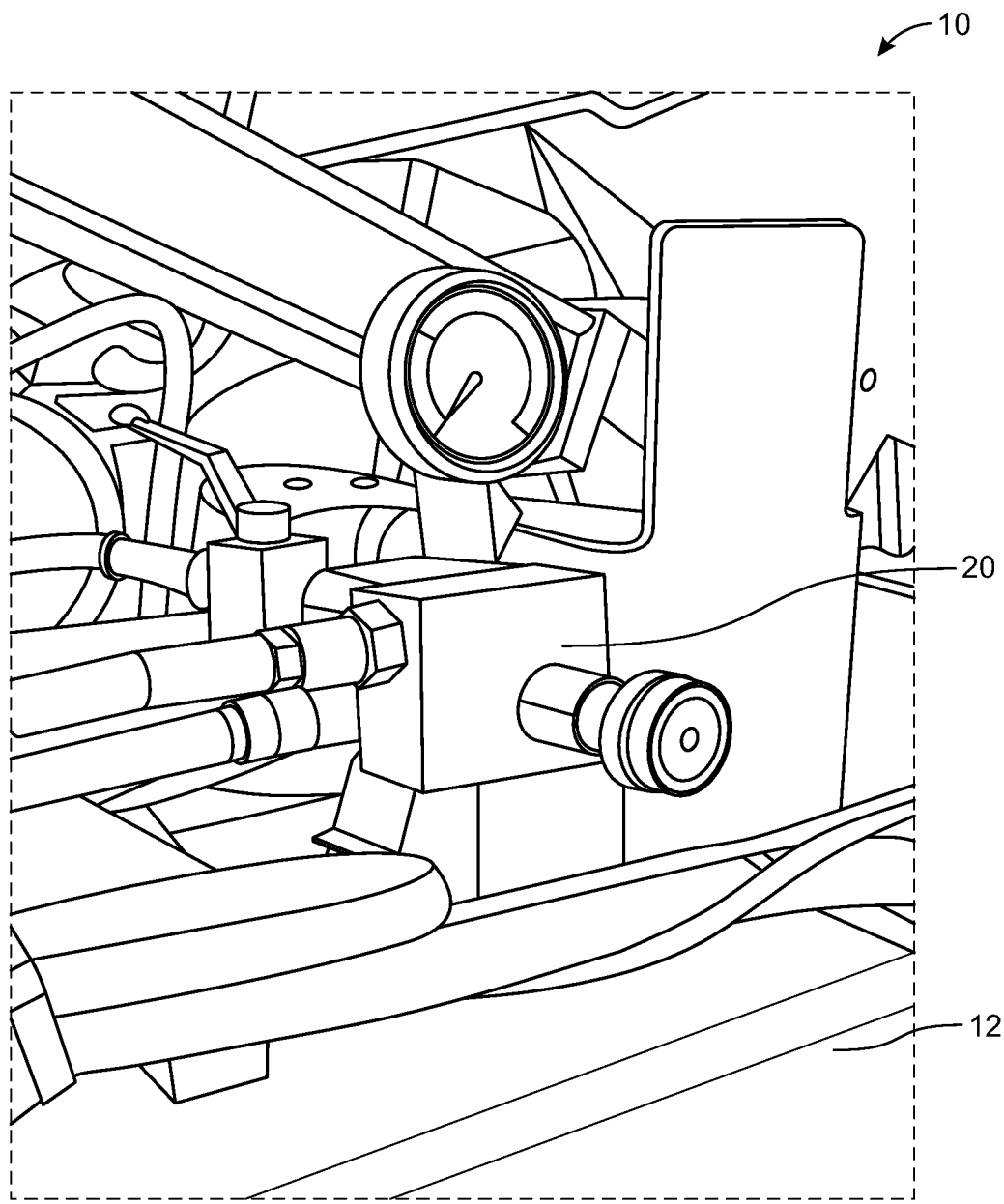
FIG. 6 is a front right perspective view of a constant down-pressure control valve for ground opener cylinders of a towed agricultural implement having an embodiment of the Active Down-Pressure Arrangement for an Agricultural Implement of the present invention, as described herein.
Figure 7:
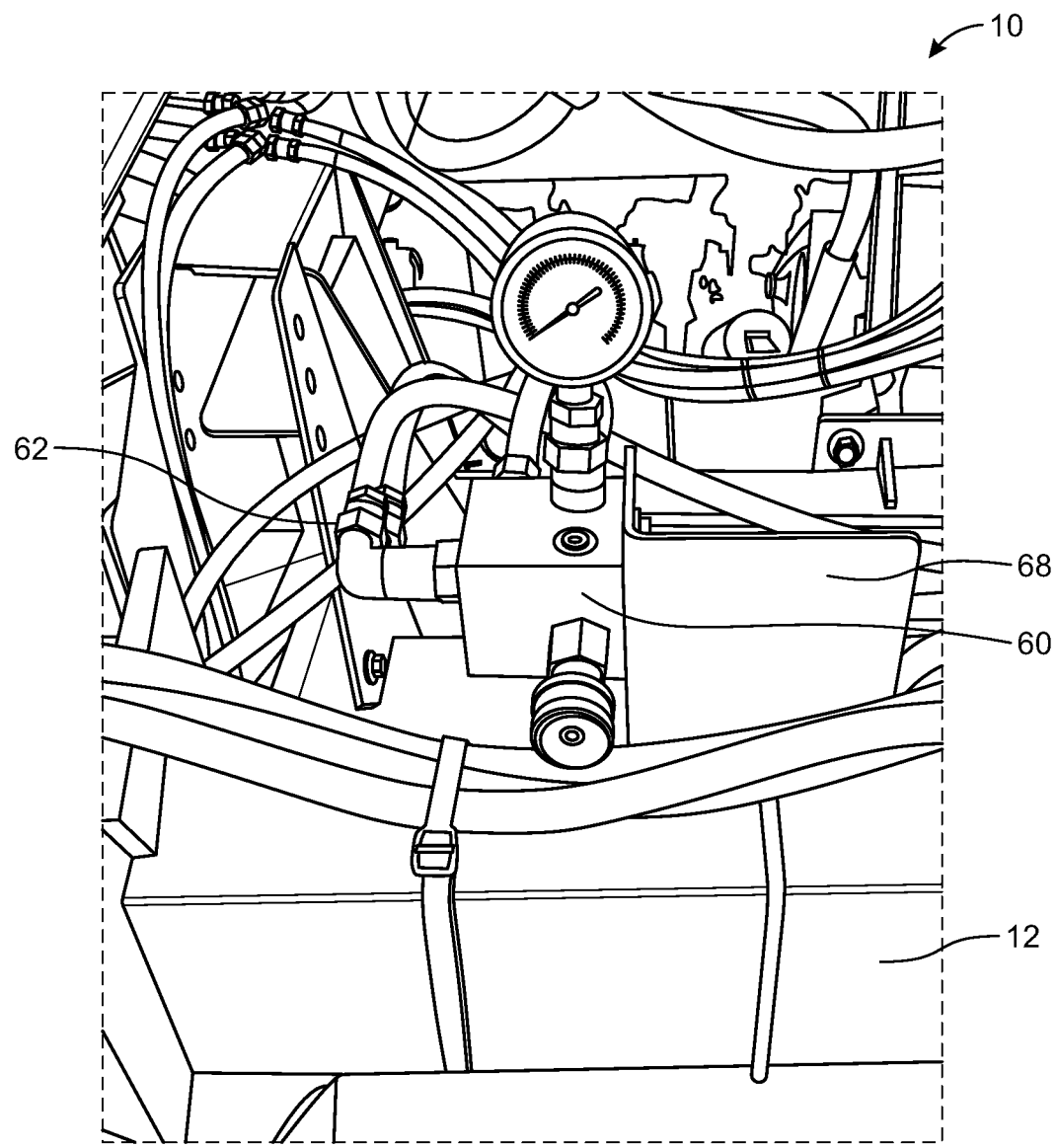
FIG. 7 is a top front perspective view of a hydraulic constant down-pressure control valve used to control down-pressure of the wings of a towed agricultural implement having an embodiment of the Active Down-Pressure Arrangement for an Agricultural Implement of the present invention, as described herein.
Figure 8:
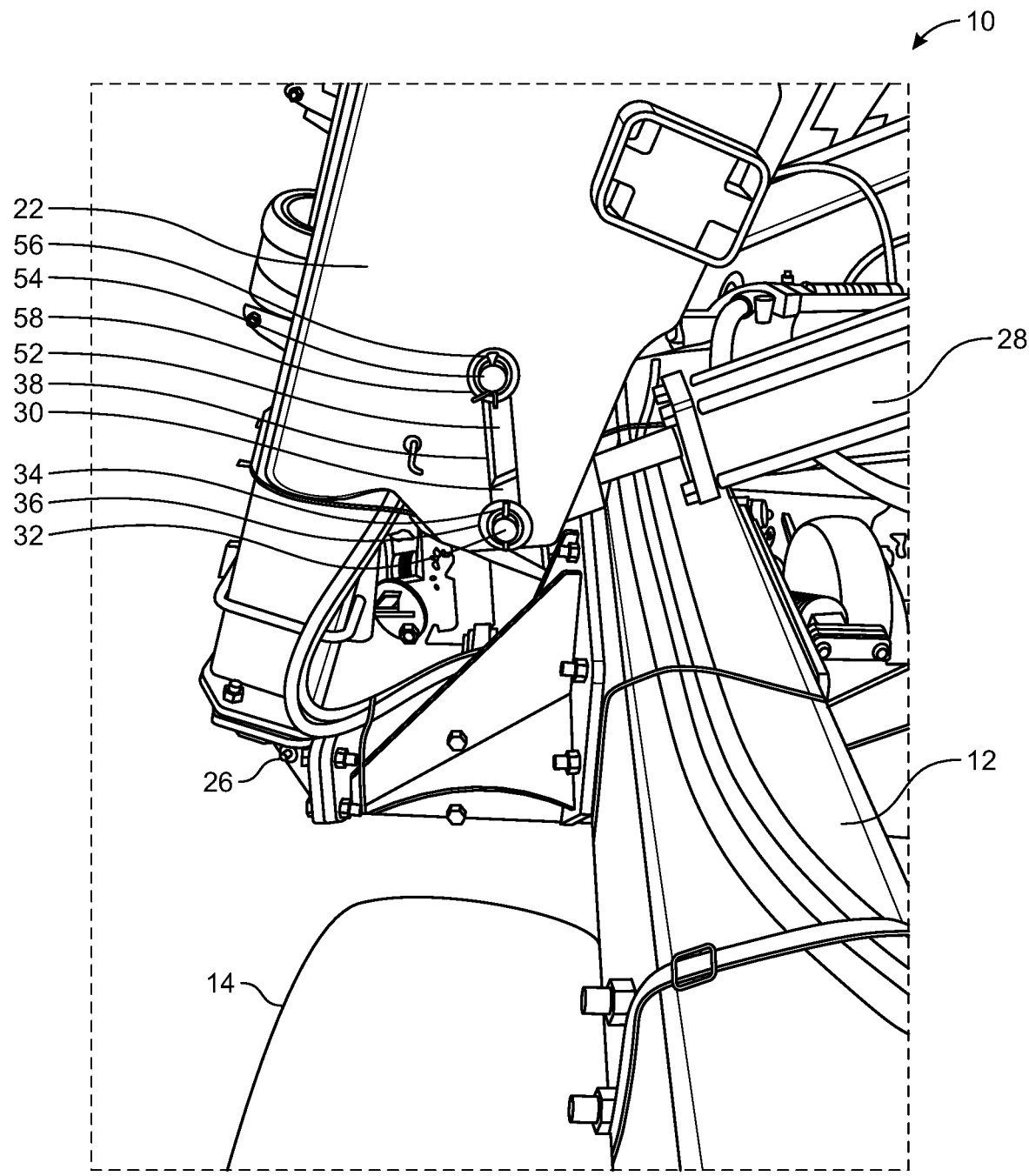
FIGS. 8 and 9 are front views of an embodiment of the Active Down-Pressure Arrangement for an Agricultural Implement of the present invention, as described herein.
Figure 9:
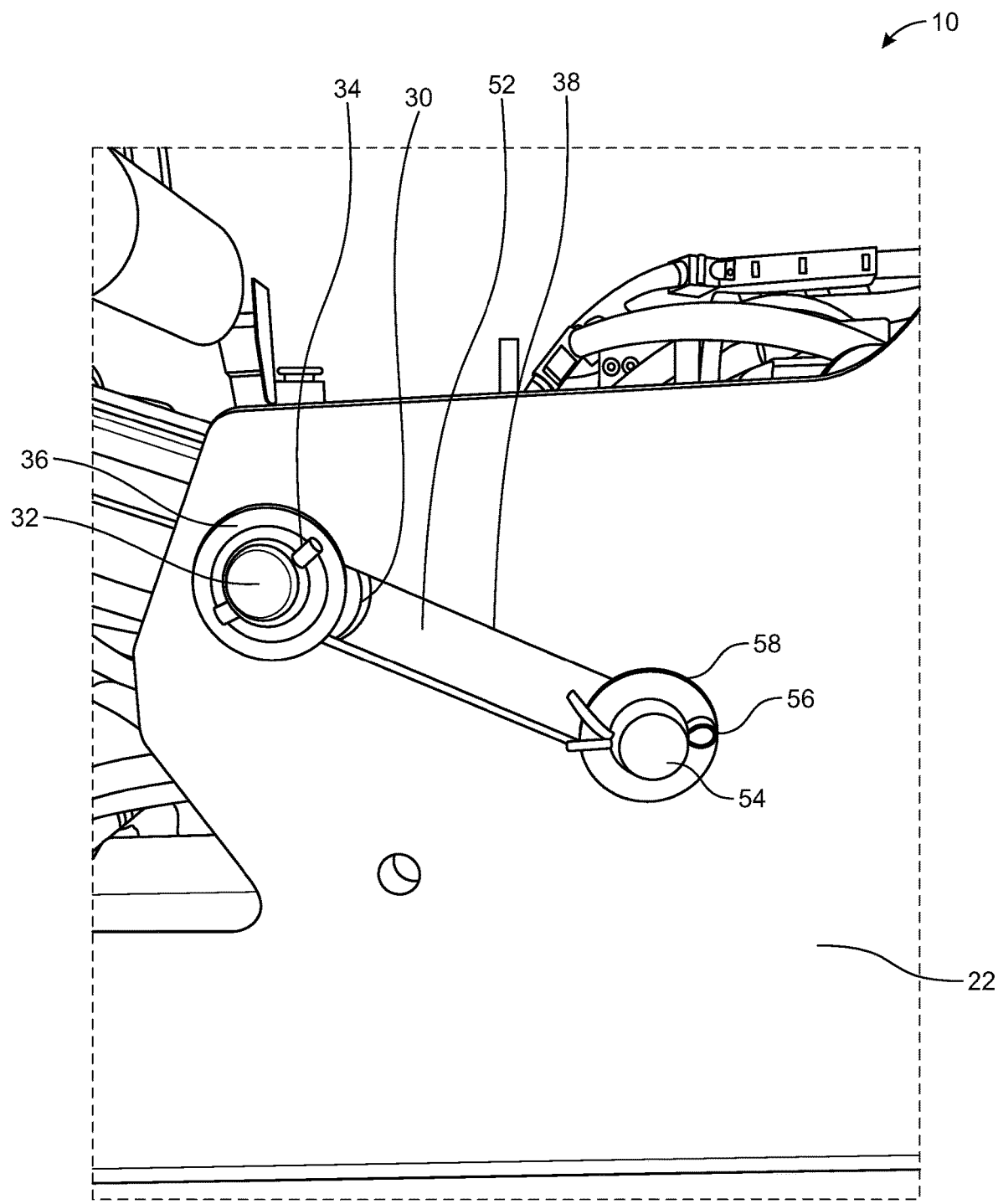
Figure 10:
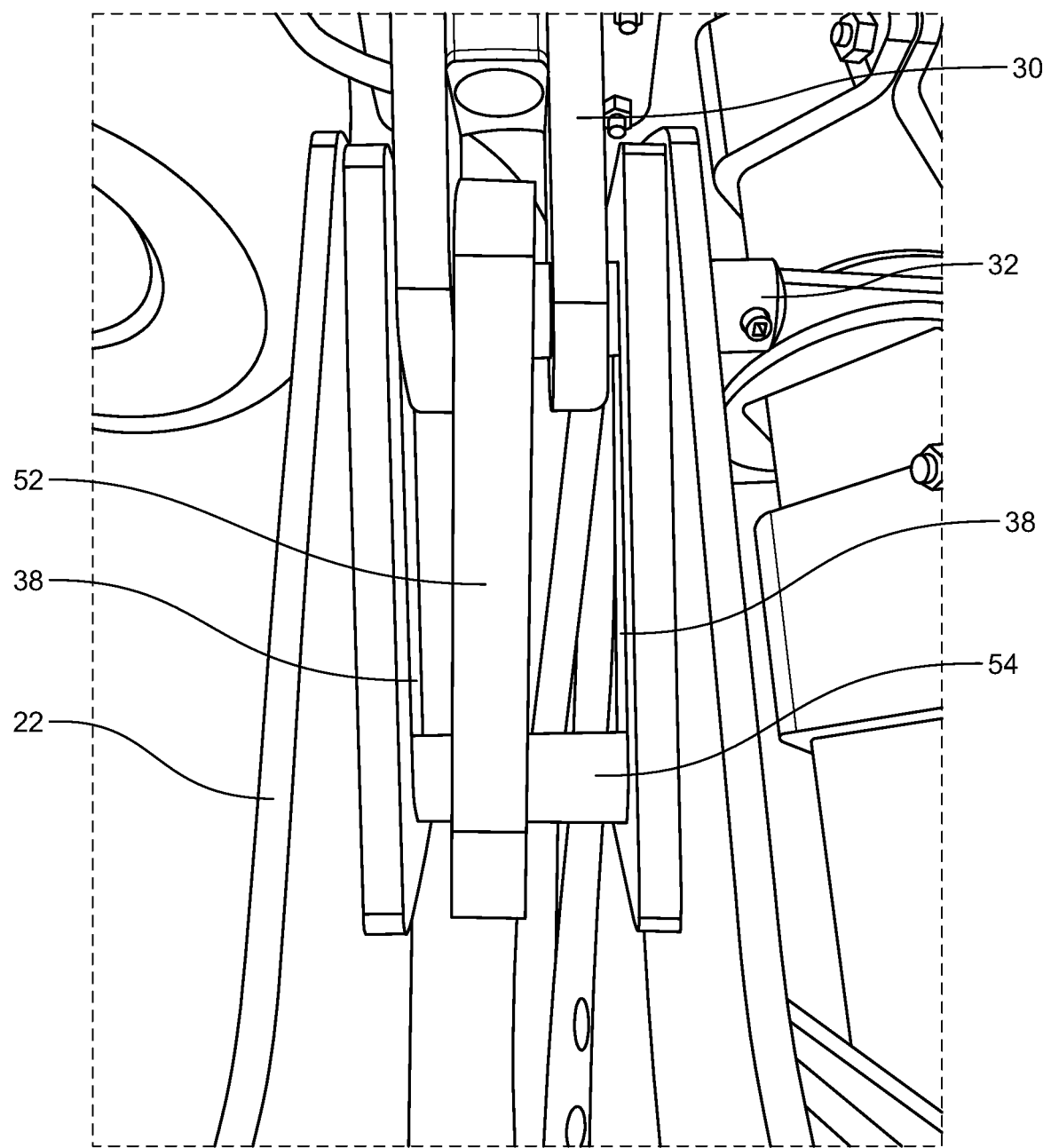
FIG. 10 is a top view of an embodiment of the Active Down-Pressure Arrangement for an Agricultural Implement of the present invention, as described herein.
Figure 11:
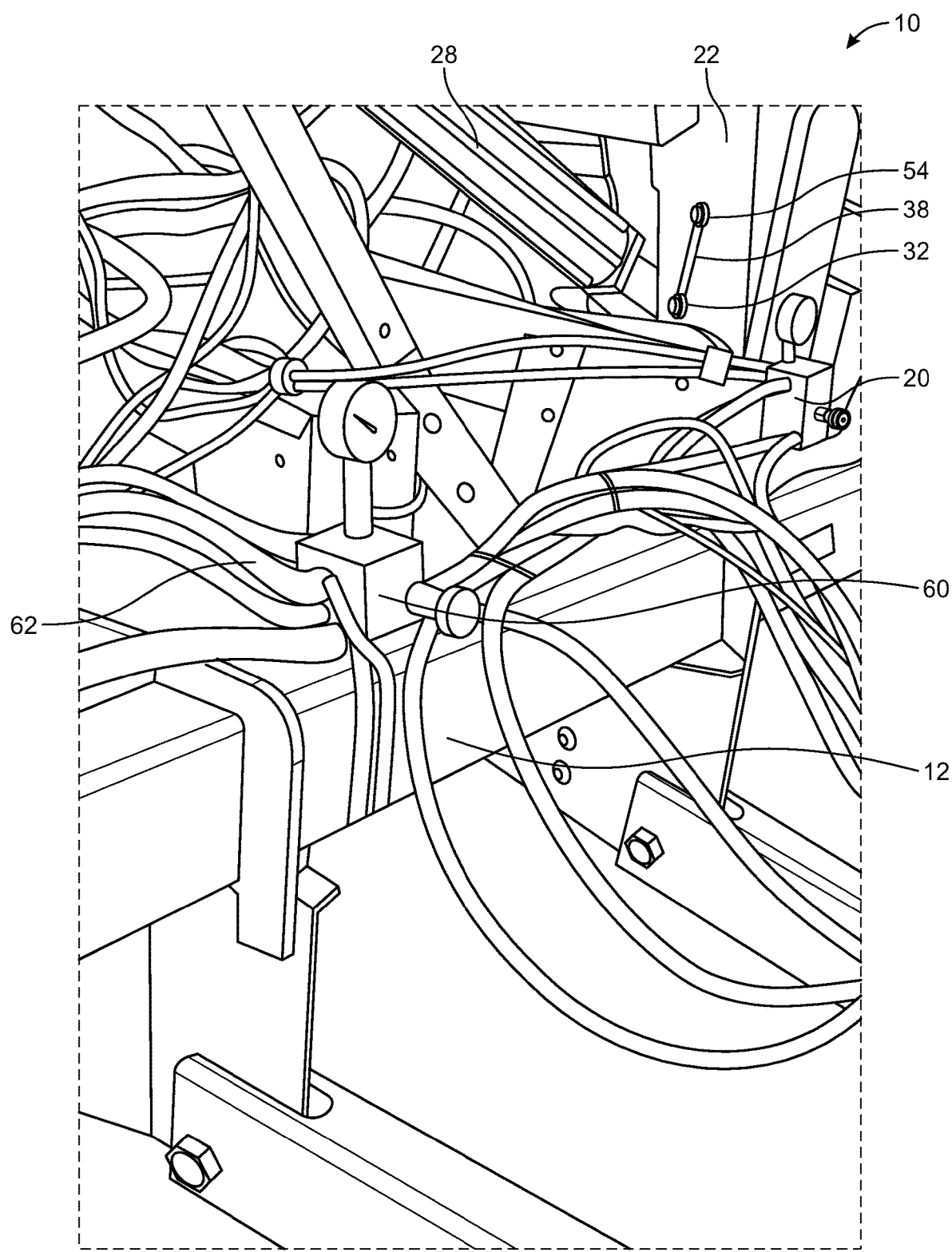
FIG. 11 is a front right perspective view of a constant down-pressure control valve for ground opener cylinders and a hydraulic constant down-pressure control valve used to control down-pressure of the wings of a towed agricultural implement having an embodiment of the Active Down-Pressure Arrangement for an Agricultural implement of the present invention, as described herein.
Figure 12:
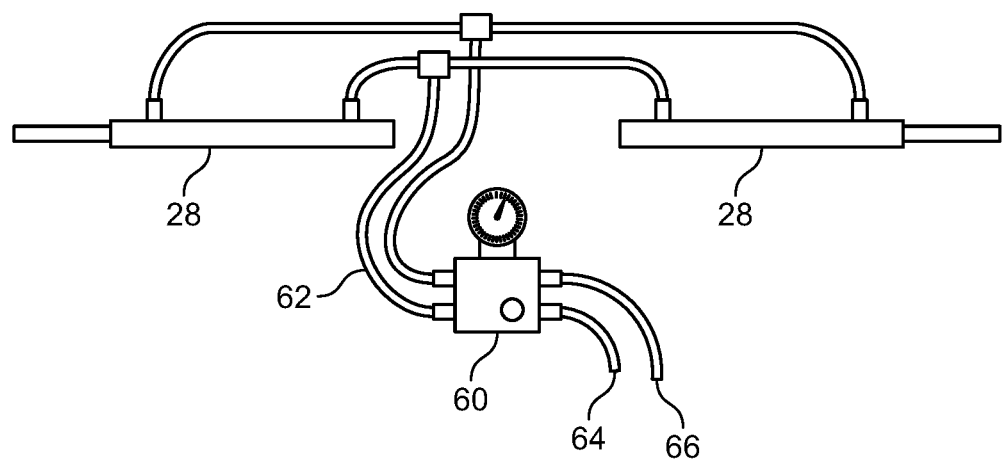
FIG. 12 is a diagram of a hydraulic circuit of an embodiment of the Active Down-Pressure Arrangement for an Agricultural Implement of the present invention, as described herein.

Turning now to FIGS. 5 and 6, the center section 12 of an agricultural implement 10 is shown. The center section 12 is provided with ground openers 16, which are controlled in their down-pressure by way of ground opener hydraulic cylinders 18. Controlled down-pressure of the ground openers 16 is achieved by way of a constant down-pressure control valve for ground openers 20 that provides constant hydraulic pressure to the ground opener hydraulic cylinders 18.

Turning now to FIGS. 7 through 12, an agricultural implement 10 again having a non-limiting exemplary embodiment of the Active Down-Pressure Arrangement for an Agricultural implement is shown. The agricultural implement 10 again has a center section 12 and two wings 22. The center section 12 is again supported by center section bogies 14, and the wings 22 are again supported by wing bogies 24 (not shown) when in the horizontal position. The center section 12 and the wings 22 are again provided with a number of ground openers 16 or other agricultural tools (not shown) that are controlled in their down-pressure by way of a constant down-pressure control valve for ground openers 20 and ground opener hydraulic cylinders 18. The wings 22 are again connected to the center section 12 by way of wing hinges 26, so that the wings 22 may pivot about a longitudinal hinge axis to a vertical position or to a horizontal position. In order to raise and lower the wings 22, wing extension and retraction cylinders 28 are again connected to the center section 12 and to the wings 22.

According to the Active Down-Pressure Arrangement for an Agricultural Implement of the present disclosure, the wings 22 of the agricultural implement 10 have been converted from vertically free-floating to actively controlled down-pressure. As manufactured, the wing extension and retraction cylinders 28 are connected at one end to the center section 12, and at the other end to clevises 30. Pins 32 pass through the clevises 30 and through slots 38. Cotter pins 34 and washers 36 are used to retain the pins 32 within the clevises 30 and slots 38. According to the Active Down-Pressure Arrangement for an Agricultural Implement of the present disclosure, then, tie plates 52 are inserted within the clevises 30 and engage the pins 32. Second pins 54 extend through the opposite ends of the slots 38 and through the tie plates 52, thereby locking the clevises 30 and pins 32 at the ends of the slots 38 closest to the wing hinges 26 and to the center section 12. Cotter pins 56 and washers 58 are used to retain the second pins 54 within the tie plates 52 and slots 38.

A second hydraulic constant downpressure control valve 60 is then connected to the wing extension and retraction cylinders 28 by way of a hydraulic circuit 62, and is mounted to the center section 12 by way of a valve mounting bracket 68. A hydraulic supply hose 64 and hydraulic return hose 66 then connects the second hydraulic constant downpressure control valve 60 to the towing vehicle, which provides the necessary hydraulic flow and pressure. By way of the second hydraulic constant downpressure control valve 60, the wing extension and retraction cylinders 28 exert constant pressure against the wings 22, so that the previously vertically free-floating wings 22 are now actively controlled in downpressure.

Figure 13:
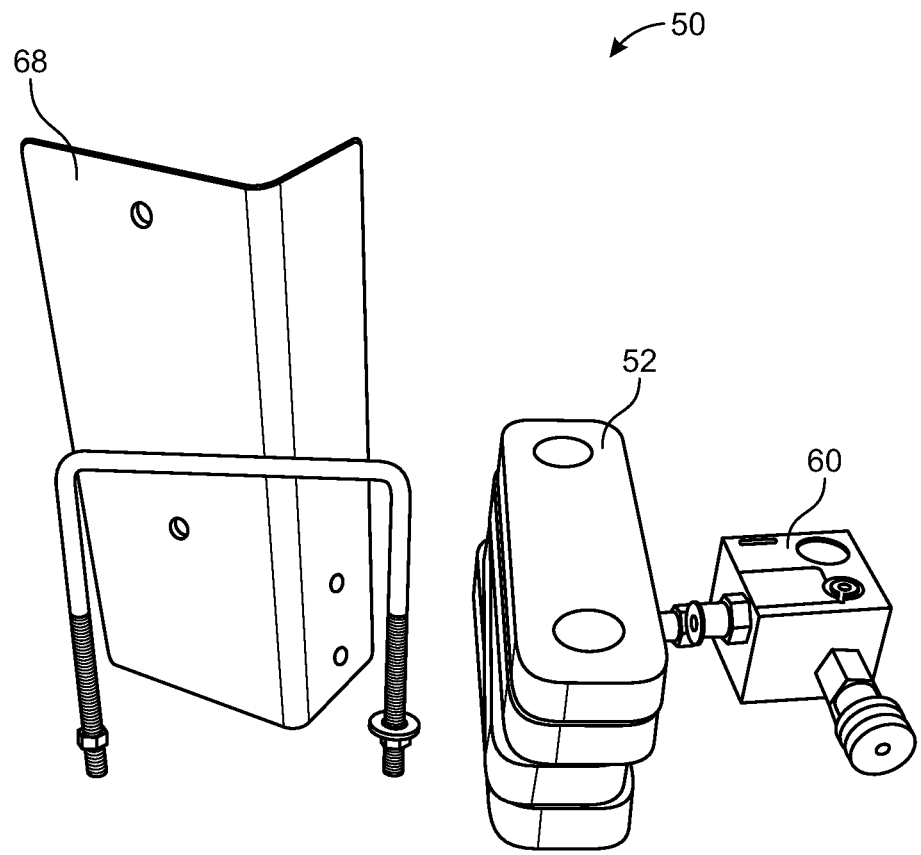
FIG. 13 is a partial embodiment of the Active Down-Pressure Arrangement for an Agricultural implement of the present invention in kit form, as described herein.

Turning now to FIG. 13, parts of a conversion kit 50 according to an embodiment of the Active Down-Pressure Arrangement for an Agricultural Implement are shown, including tie plates 52, the hydraulic constant down-pressure control valve 60, which may or may not be the same as or similar to the constant down-pressure control valve 20 for the ground openers 16, and the valve mounting bracket 68.

While the Active Down-Pressure Arrangement for an Agricultural Implement has been described with respect to at least one embodiment, the Active Down-Pressure Arrangement for an Agricultural Implement can be further modified within the spirit and scope of this disclosure, as demonstrated previously. This application is therefore intended to cover any variations, uses, or adaptations of the Active Down-Pressure Arrangement for an Agricultural Implement using its general principles. Further, this application is intended to cover such departures from the present disclosure as come within known or customary practice in the art to which the disclosure pertains and which fall within the limits of the appended claims.

REFERENCE NUMBER LISTING 10 agricultural implement
12 center section
14 center section bogie
16 ground openers
18 ground opener hydraulic cylinders
20 constant down-pressure control valve for openers
22 wing
24 wing bogie
26 wing hinge
28 wing extension and retraction cylinder
30 clevis
32 pin
34 cotter
36 washer
38 slot
50 conversion kit
52 tie plate
54 second pin
56 cotter
58 washer
60 hydraulic constant down-pressure control valve
62 hydraulic circuit
64 hydraulic supply
66 hydraulic return
68 valve mounting bracket

What is claimed is:

1. A conversion kit for converting at least one wing of an agricultural implement from dedicated vertically free-floating wings to at least one wing having active down-pressure, wherein:
   the agricultural implement having a center section and the at least one wing;
   the agricultural implement having been manufactured with at least one hydraulic cylinder operable to raise the at least one wing to a vertical position and to lower the at least one wing to a horizontal position;
   the at least one hydraulic cylinder being connected at one end to the center section, and being connected at its other end to the at least one wing by way of a clevis having two prongs, a first pin, and a pair of slots, each of the pair of slots being located adjacent to one of the two prongs of the clevis;
   the at least one hydraulic cylinder, the clevis, the first pin, and the pair of slots being further configured so that when the at least one wing is in the horizontal position, the at least one wing of the agricultural implement as manufactured free-floats vertically by way of unrestricted motion of the first pin in the pair of slots; the conversion kit comprising:
   a tie-plate and a second pin configured to engage the first pin and the pair of slots, and to restrict the motion of the first pin in the pair of slots; and
   a pressure controlled hydraulic circuit connected to the at least one hydraulic cylinder and operable to control an amount of down-pressure applied by the at least one hydraulic cylinder, wherein
   the tie-plate engages the first pin at an end of the pair of slots proximal to the center section, and engages the second pin at an end of the pair of slots distal to the center section, and wherein
   the tie-plate engages the first pin within the space between the two prongs of the clevis that is connected to the at least one cylinder.

2. The conversion kit of claim 1, wherein:
   the pressure controlled hydraulic circuit further comprises a hydraulic pressure control valve.

3. The conversion kit of claim 1, wherein:
   the pressure controlled hydraulic circuit further comprises a hydraulic valve configured to selectively act as both a hydraulic pressure control valve and a non-pressure control valve.

4. A method of converting at least one wing of an agricultural implement from dedicated free-floating operation to active down-pressure, comprising the steps of:
   providing the agricultural implement having a center section and the at least one wing;
   the agricultural implement having been manufactured with at least one hydraulic cylinder operable to raise the at least one wing to a vertical position and to lower the at least one wing to a horizontal position;
   the at least one hydraulic cylinder being connected at one end to the center section, and being connected at its other end to the at least one wing by way of a clevis having two prongs, a first pin, and a pair of slots, each of the pair of slots being located adjacent to one of the two prongs of the clevis;
   the at least one hydraulic cylinder, the clevis, the first pin, and the pair of slots being further configured so that when the at least one wing is in the horizontal position, the at least one wing of the agricultural implement as manufactured free-floats vertically by way of unrestricted motion of the first pin in the pair of slots;
   engaging a tie-plate and a second pin with the first pin and the pair of slots, and restricting by way of the tie-plate and the second pin the motion of the first pin in the pair of slots; and
   connecting a pressure controlled hydraulic circuit to the at least one hydraulic cylinder and operating the pressure controlled hydraulic circuit to control an amount of down-pressure applied by the at least one hydraulic cylinder, wherein the tie-plate is engaged with the first pin at an end of the pair of slots proximal to the center section, and is engaged with the second pin at an end of the pair of slots distal to the center section, and wherein the tie-plate is engaged with the first pin within the space between the two prongs of the clevis that is connected to the at least one cylinder.

5. The method of claim 4, wherein:
the pressure controlled hydraulic circuit further comprises a hydraulic pressure control valve.

6. The method of claim 4, wherein:
the pressure controlled hydraulic circuit further comprises a hydraulic valve configured to selectively act as both a hydraulic pressure control valve and a non-pressure control valve.

7. A conversion kit for converting at least one wing of an agricultural implement from dedicated vertically free-floating wings to at least one wing having active down-pressure, wherein:

the agricultural implement having a center section and the at least one wing;
   the agricultural implement having been manufactured with at least one hydraulic cylinder operable to raise the at least one wing to a vertical position and to lower the at least one wing to a horizontal position;
   the at least one hydraulic cylinder being connected at one end to the center section, and being connected at its other end to the at least one wing by way of a first pin and a pair of slots;
   the at least one hydraulic cylinder, the first pin, and the pair of slots being further configured so that when the at least one wing is in the horizontal position, the at least one wing of the agricultural implement as manufactured free-floats vertically by way of unrestricted motion of the first pin in the pair of slots; the conversion kit comprising:

a clevis having two prongs, a tie-plate, and a second pin configured to engage the first pin and the pair of slots, and to restrict the motion of the first pin in the pair of slots; and a pressure controlled hydraulic circuit connected to the at least one hydraulic cylinder and operable to control an amount of down-pressure applied by the at least one hydraulic cylinder, wherein the clevis is interposed between and connected to the at least one hydraulic cylinder and the first pin, the tie-plate engages the first pin at an end of the pair of slots proximal to the center section, and engages the second pin at an end of the pair of slots distal to the center section, and wherein the tie-plate engages the first pin within the space between the two prongs of the clevis that is connected to the at least one cylinder.

8. The conversion kit of claim 7, wherein:
the pressure controlled hydraulic circuit further comprises a hydraulic pressure control valve.

9. The conversion kit of claim 7, wherein:
the pressure controlled hydraulic circuit further comprises a hydraulic valve configured to selectively act as both a hydraulic pressure control valve and a non-pressure control valve.

\* \* \* \* \*